C. ALLEN.
Hot-Air Furnace.
No. 89,458.
Patented April 27, 1869.
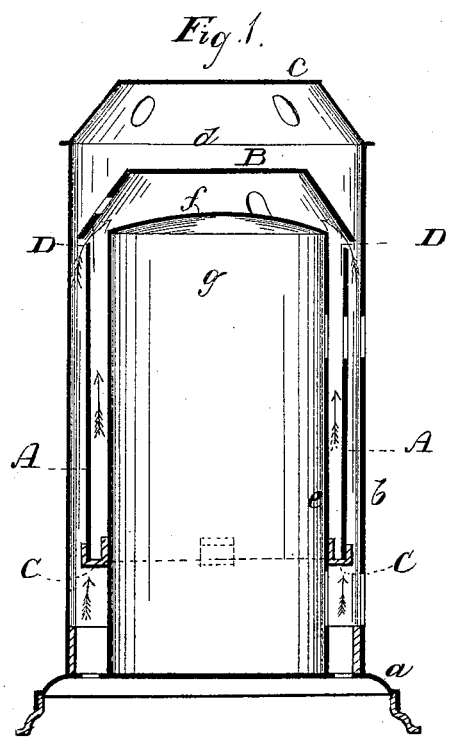
Witnesses.
Inventor.
Charles Allen

CHARLES ALLEN, OF HARTFORD, CONNECTICUT.

Letters Patent No. 89,458, dated April 27, 1869.

IMPROVEMENT IN HOT-AIR FURNACES.

The Schedule referred to in these Letters Patent and making part of the same.

*To all whom it may concern:*

Be it known that I, CHARLES ALLEN, of the city and county of Hartford, and State of Connecticut, have invented certain new and useful Improvements in Hot-Air Furnaces; and to enable others skilled in the art to make and use the same, I will proceed to describe, by referring to the drawings, in which the same letters indicate like parts in each of the figures.

The nature of this invention consists in providing an intermediate partition between the inner and outer walls of a furnace, (commonly used for air-conducting space,) and between the head of the combustion-chamber and the bonnet which covers, or forms the hot-air chamber, the object of which is to divide the current of air, and cause it (the air) to thoroughly absorb the heat imparted to the heated surfaces.

In the accompanying drawings—

Figure 1 is a sectional side view.

$a$ is the base of a furnace.

$b$ is the body, or outer wall of a furnace.

$c$ is the head, or bonnet, which covers the outer wall, and forms a hot-air chamber, $d$.

$e$ is the inner wall, which forms the combustion-chamber $g$.

$f$ is the head-plate, which closes the upper end of the combustion-chamber $g$.

The fire-pot, and feed and draught-openings, &c., with the furnace, as thus far described, are constructed in the common way.

A is the intermediate cylindrical plate, arranged between the inner and outer walls $b$ $e$, and is supported at the lower end by brackets, C, or their equivalents.

B is an intermediate bonnet, or plate, arranged in the hot-air chamber $d$, and between the plates $c$ $f$, and is supported from the plate A by brackets, D.

Thus, the air is allowed free circulation each side of the plates A B, and the heat from the surface of the plates is taken up and carried forward in the air, thereby absorbing the entire heat of the furnace by the air for heating apartments.

We believe we have thus shown the nature, construction, and advantage of this invention, so as to enable others skilled in the art to make and use the same therefrom.

What I claim, and desire to secure by Letters Patent, is—

The plates A B, in combination with the inner and outer walls $b$ $e$ of a furnace, arranged substantially as described.

CHARLES ALLEN.

Witnesses:
E. W BLISS,
JEREMY W. BLISS.